US012135427B1

(12) United States Patent
Koscheka et al.

(10) Patent No.: US 12,135,427 B1
(45) Date of Patent: Nov. 5, 2024

(54) THOUGH-THE-LENS HEADS-UP DISPLAY

(71) Applicant: Designs for Vision, Inc., Bohemia, NY (US)

(72) Inventors: Kenneth Koscheka, Wading River, NY (US); Matthew D. Siedman, Babylon, NY (US); Matthew A. Kenyon, St. James, NY (US); Moty Solomon, Beit uzziel (IL); Richard E. Feinbloom, New York, NY (US)

(73) Assignee: Designs for Vision, Inc., Bohemia, NY (US)

( * ) Notice: Subject to any disclaimer, the term of this patent is extended or adjusted under 35 U.S.C. 154(b) by 0 days.

(21) Appl. No.: 17/340,070

(22) Filed: Jun. 6, 2021

Related U.S. Application Data (60) Provisional application No. 63/036,246, filed on Jun. 8, 2020.

(51) Int. Cl.
G02B 27/01 (2006.01)

(52) U.S. Cl.
CPC .... G02B 27/017 (2013.01); *G02B 2027/0178* (2013.01)

(58) Field of Classification Search
CPC .......... G02B 27/017; G02B 2027/0178; G06F 3/011
See application file for complete search history.

(56) References Cited

U.S. PATENT DOCUMENTS

| | | | |
|---|---|---|---|
| 3,273,456 A | 9/1966 | Feinbloom | |
| 7,682,042 B2 | 3/2010 | Feinbloom | |
| 8,851,709 B2 | 10/2014 | Feinbloom | |
| RE46,463 E | 7/2017 | Feinbloom | |
| 9,720,260 B2 | 8/2017 | Calilung | |
| 9,791,138 B1 | 10/2017 | Feinbloom | |
| 10,240,769 B1 | 3/2019 | Braganca | |
| 10,247,384 B1 | 4/2019 | Feinbloom | |
| 10,288,886 B2 | 5/2019 | Jannard | |
| 10,288,908 B2 | 5/2019 | Calilung | |
| 10,527,254 B1 | 1/2020 | Feinbloom | |
| 2010/0053311 A1* | 3/2010 | Luber | G02B 25/004 348/53 |
| 2012/0275140 A1 | 11/2012 | Feinbloom | |
| 2013/0100534 A1 | 4/2013 | Jannard | |
| 2015/0123880 A1* | 5/2015 | Tam | G02B 27/0172 345/8 |
| 2015/0146290 A1* | 5/2015 | Chang | G02B 25/00 359/481 |
| 2018/0324177 A1* | 11/2018 | Wang | G06F 16/532 |
| 2019/0076013 A1* | 3/2019 | Aferzon | H04N 13/344 |

* cited by examiner

*Primary Examiner* — Matthew A Eason
*Assistant Examiner* — Chayce R Bibbee
(74) *Attorney, Agent, or Firm* — Law Office of Carl Giordano, PC (57) ABSTRACT

A eyewear comprising a heads-up display provides information to a user without the user losing focus on a work area is presented. The eyewear further includes magnification devices that are oriented within the eyewear to magnify the work area. The heads-up displays information provides information to the user in a manner such that the user may view the provided information without changing their orientation or eye position.

11 Claims, 9 Drawing Sheets

THOUGH-THE-LENS HEADS-UP DISPLAY

CLAIM OF PRIORITY

This application claims, pursuant to 35 USC 119, priority to, and the benefit of the earlier filing date of, patent application Ser. No. 63/036,246 filed on Jun. 8, 2020, the contents of which are incorporated by reference, herein.

FIELD OF THE INVENTION

This application is related to the field of optical devices and particularly to a head mounted heads-up display system.

RELATED APPLICATION

This application is related to the U.S. Pat. Nos. 3,273,456; 7,682,042; 8,851,709; RE 46463; U.S. Pat. Nos. 9,791,138; 10,240,769; 10,247,384; and 10,527,254, the contents of all of which are incorporated by reference, herein.

BACKGROUND OF THE INVENTION

Lighting devices are typically used in dental, medical and/or surgical fields to allow practitioners (e.g., dentist, doctor) to have a light applied directly to the area where the practitioner is viewing. Head-mounted lighting devices as they provide tight light beam directly coincident with the practitioner's line of sight while preventing practitioner's shadow from being projected onto the work area.

Head-mounted devices are known in the art. For example, U.S. Pat. No. 8,851,709; RE46463; U.S. Pat. Nos. 9,791, 138; 10,240,769; and 10,527,254, which are assigned to the Assignee of the instant application, disclose head-mounted lighting devices and their control and operation.

Typically, these head mounted devices incorporate a magnification device to allow the practitioner (e.g., a dentist, a doctor, a surgeon) to view an enlarged area that the practitioner is focused on.

However, while the practitioner is focused on the work area the practitioner must consider additional information that is around him/her regarding the health of a patient. For example, a surgeon may be required to view an overhead display screen to monitor and obtain information regarding a status of the patient's condition. For example, heartrate, blood pressure, etc., may be conditions that the practitioner may require knowledge of during a procedure conducted on a patient.

In this case, the practitioner is required to remove his/her eyes from the patient to look at the display screen to obtain the patient information and then refocus his/her attention to the working area. All of which contributes to an inefficiency in the practitioner's performance. Hence there is a need in the industry for a system and devices that provide information to the practitioner in a more efficient manner to reduce the need for the practitioner to remove their focus from the patient and/or working area.

SUMMARY OF THE INVENTION

It is the object of the invention to provide a system that provides information to a user whose attention is focused on a work area without the user diverting their attention to another area to obtain needed information.

A system is presented for providing information to a user, such as a dentist, doctor, surgeon, etc., through a display system that is incorporated onto an eyewear worn by the user. The display system provides information, such as medical information or instructional information to the user without the user losing focus on a working area.

A system is presented for providing information to a user without requiring the user to lose focus with a work area, wherein the work area is defined by the orientation of magnification devices utilized by the user.

A system is presented for providing information to a user of an eyewear wherein the user is provided information to enable the user to view through a display system included within the eyewear.

A through-the-lens head-mounted system incorporated into an eyewear worn by a user is presented that provides information to the user through the eyewear without requiring the user to change their position with respect to a work area.

BRIEF DESCRIPTION OF DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

It is to be understood that the figures and descriptions of the present invention described herein have been simplified to illustrate the elements that are relevant for a clear understanding of the present invention, while eliminating for purposes of clarity, many other elements. However, because these omitted elements are well-known in the art, and because they do not facilitate a better understanding of the present invention, a discussion of such elements is not provided herein. The disclosure herein is directed also to variations and modifications known to those skilled in the art.

DETAILED DESCRIPTION OF THE INVENTION

Figure 1:
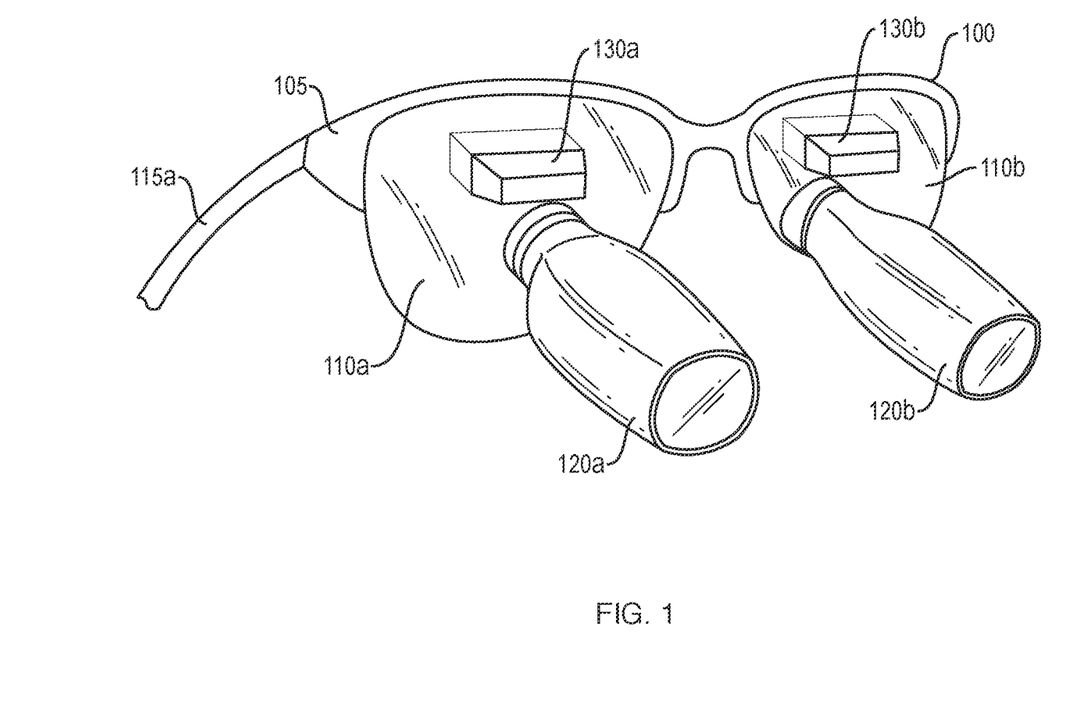
FIG. 1 illustrates a prospective view of an exemplary embodiment of an eyewear configuration incorporating a through-the-lens heads-up display in accordance with the principles of the invention.

FIG. 1 illustrates a prospective view of an exemplary through-the-lens carrier display system in accordance with the principles of the invention.

In this illustrated embodiment eyewear 100 comprises frame 105 including carrier lens 110a and 110b and temple 115 extending from an outer edge of the left side of frame 105 and from an outer edge of the right side of frame 105 (not shown).

Further illustrated are magnification devices 120a and 120b incorporated into respective ones of carrier lens 110a and carrier lens 110b, wherein magnification devices 120a, 120b, are positioned through respective carrier lenses 110a, 110b.

Magnification devices 120a, 120b provide for a known level of magnification of an object (not shown) viewed, wherein the level of magnification of magnification devices 120a, 120b is based in part on the characteristics of the lens carrier (objective and eye) within magnification device 120a, 120b and the distance separating the objective and the eye lens.

Further illustrated are display systems 130a, 130b incorporated into respective ones of carrier lenses 110a, 110b. Display system 130a, 130b, similar to magnification devices 120a, 120b are positioned through respective carrier lenses 110a, 110b (i.e., through-the-lens). Each of 11 display system 130a, 130b provides the user with information that conventionally would be displayed on a display screen and require the user to advert their eyes from an area the user is working on or viewing (i.e., working area).

The through-the-lens display units 130a, 130b are mounted through a corresponding one of carrier lenses 110a, 110b with a desired interpupillary distance (IPD) between them, wherein the IPD is based, in part, by the eye position of the user. A more detailed discussion of the interpupillary distance with regard to magnification devices 120a, 120b may be found in U.S. Pat. No. 3,273,456.

Figure 2:
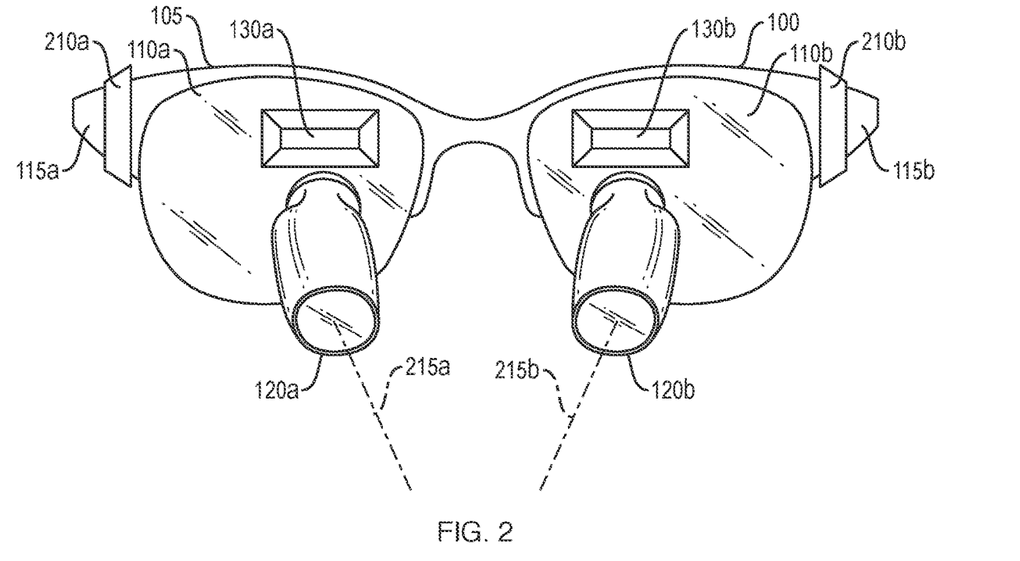
FIG. 2 illustrates a front view of the exemplary embodiment of the eyewear configuration shown in FIG. 1.

FIG. 2 illustrates a front view of the exemplary embodiment of the through-the-lens heads-up display configuration shown in FIG. 1, wherein frame 105 includes carrier lenses 110a, 110b, magnification devices 120a, 120b, display units 130a, 130b and left temple 115a and right temple 115b, as previously discussed.

Further illustrated are driver circuitry 210a, 210b attached to temples 115a, 115b, respectively. Driver circuitry 210a, 210b provide one or more of control signals and video signals to respective ones of display units 130a, 130b.

Although two driver circuits are shown, it would be recognized that a single driver circuit may be utilized to drive one or both of display units 130a, 130b. Driver circuits 210a, 210b, although shown attached to temples 115a, 115b, may be positioned external to frame 105.

Further illustrated are the optical axis 215a, 215b associated with each of magnification devices 120a, 120b. As shown the optical (or line of sight) axis 215a, 215b of magnification devices 120a, 120b are directed both inwardly (i.e., toe-in—position of the front of the element is less than the rear of the element) and downwardly (i.e., angle of declination) so as to converge onto a point or working area (not shown) a known distance from eyewear 100. The convergence of the optical axis of magnification devices 120a, 120b allows for the binocular viewing of an object at the (not shown} working area.

The toe-in angle of magnification devices 120a, 120b with respect to carrier lenses 110a, 110b, is determined based, in part, on the IPD of the user and the distance of the (not shown) point or working area is from the eyewear 100.

Figure 3:
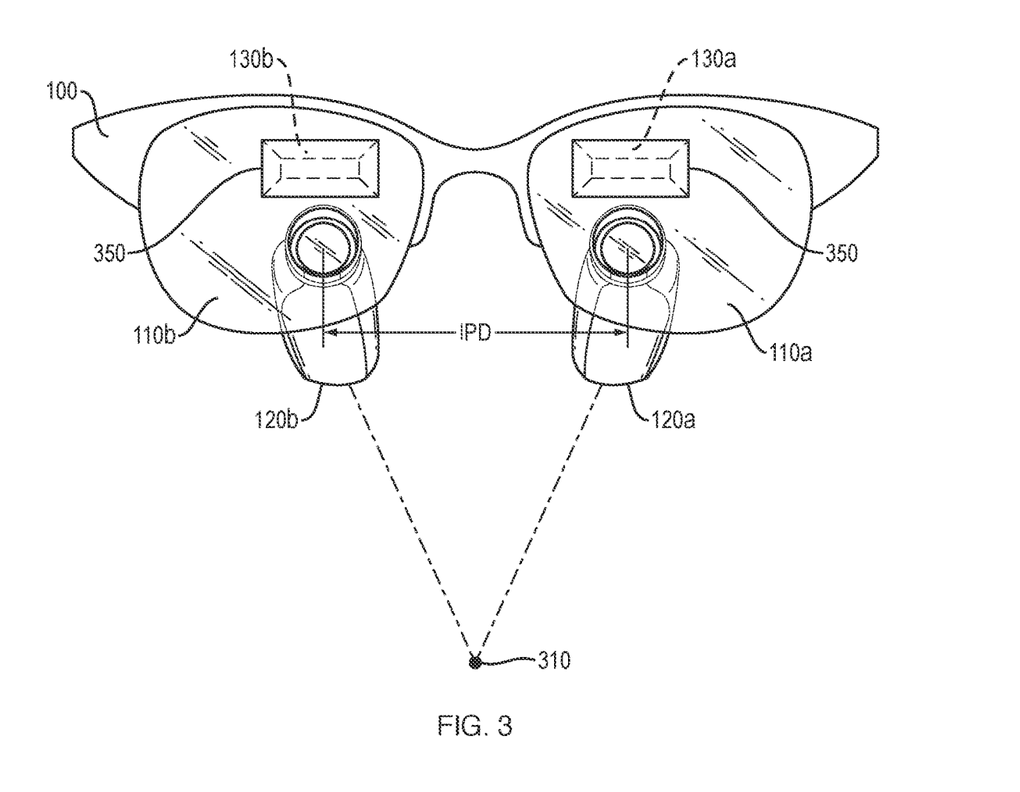
FIG. 3 illustrates a rear view of the exemplary embodiment of the eyewear configuration shown in FIG. 1.

FIG. 3 illustrates a rear of the eyewear configuration shown in FIG. 1, comprising carrier lenses 110a, 110b, magnification devices 120a, 120b separated by the inter-pupil distance (IPD) and the toe-in angle of magnification devices 120a, 120b such that optical axis 215a, 215b converge onto working area 310.

Further illustrated is the through-the-lens configuration of both magnification devices 120a, 120b and display devices 130a, 130b which include display screen 350.

Figure 4:
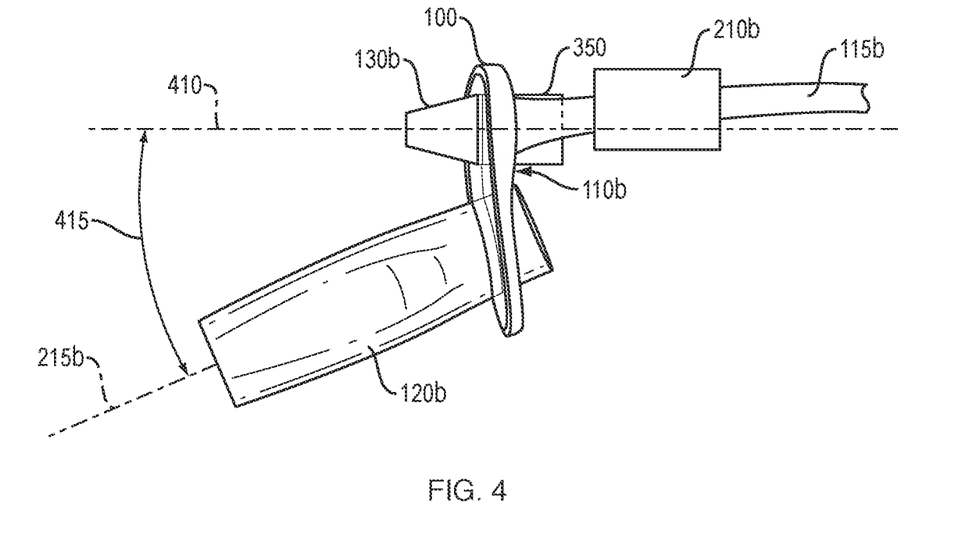
FIG. 4 illustrates a right-side view of the exemplary embodiment of the eyewear configuration shown in FIG. 1.

FIG. 4 illustrates a right-side view of the exemplary eyewear configuration shown in FIG. comprising magnification device 120b and display unit 130b, each inserted through carrier lens 110b, wherein magnification device 120 is oriented downwardly (i.e., angle of declination, 415) from horizontal axis 410. Further illustrated is driver circuit 210b positioned on temple 115b.

Figure 5:
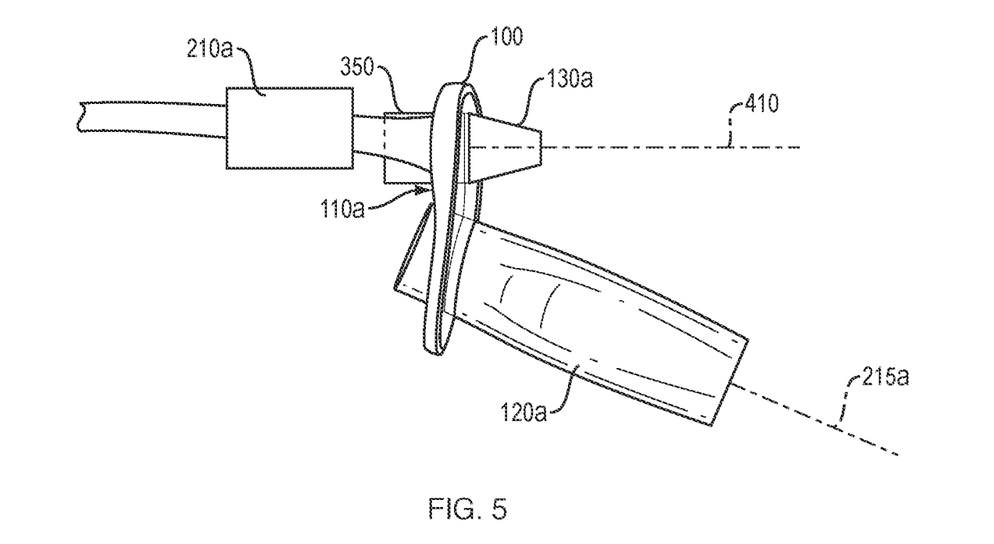
FIG. 5 illustrates a left-side view of the exemplary embodiment of the eyewear configuration shown in FIG. 1.

FIG. 5 illustrates a left side view of the exemplary eyewear configuration shown in FIG. 1, wherein magnification device 120a and display unit 130a are positioned through carrier lens 110a.

Although, FIGS. 4 and 5 illustrate display units 130a, 130b as being substantially parallel to a horizontal axis 410, which is shown substantially perpendicular to lenses 110a, 110b, it would be understood that display units 130a, 130b may be oriented at an angle similar one or both of the toe-in angle and the angle of declination of magnification devices 120a, 120b.

Figure 6:
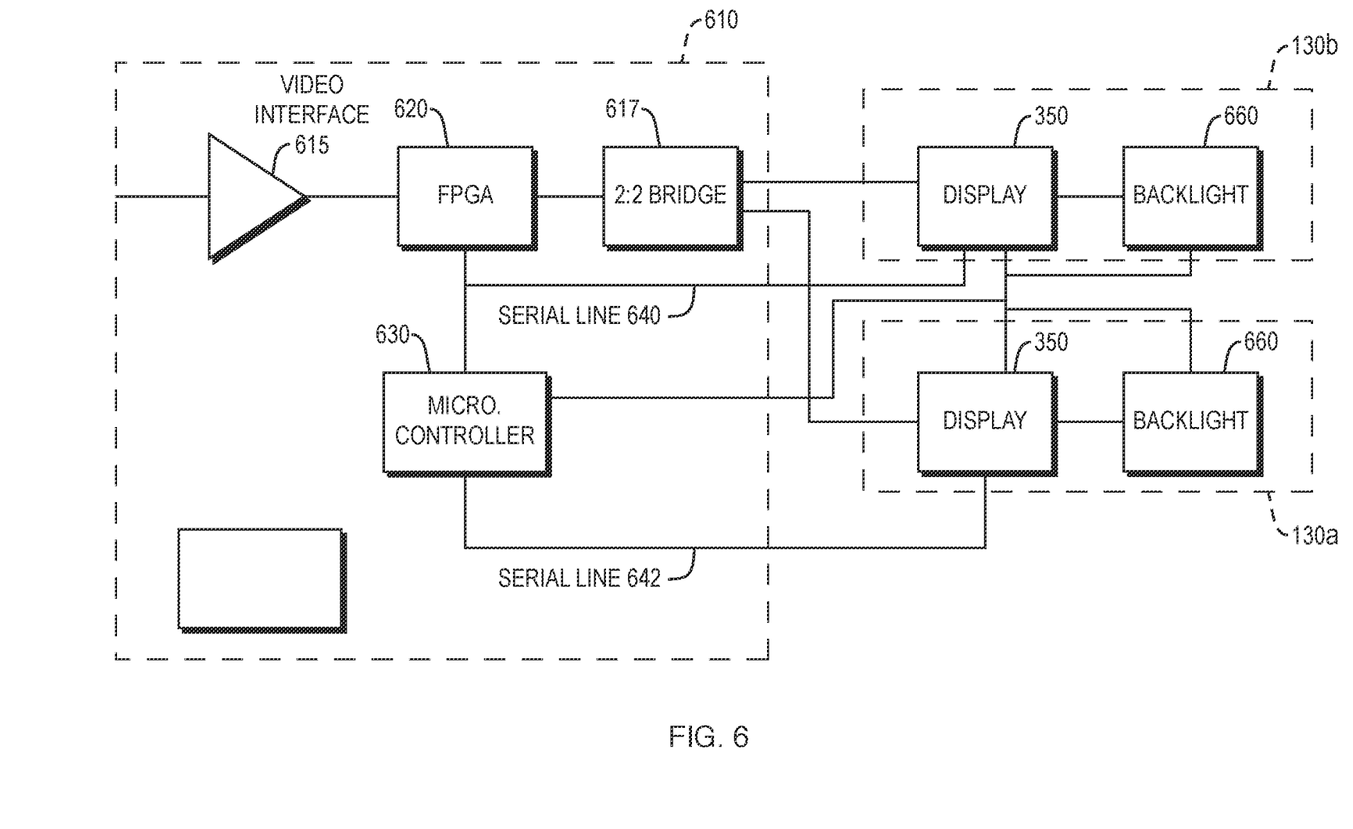
FIG. 6 illustrates a block diagram of an exemplary through-the-lens heads-up display configuration in accordance with the principles of the invention.

FIG. 6 illustrates a block diagram of an exemplary driver circuit configuration using a buffered, single video processor to drive individual display units 130a, 130b, in accordance with the principles of the invention.

In this illustrated embodiment, driver circuits 210a, 210b are incorporated into a single driver circuit 610 comprises a video interface 615 configured to receive information (such as video signals) from one or more monitors and/or equipments.

The received signals may be received through a wire-ed connection or a wireless connection. The received signals are provided to electronic circuitry 620/630, which may comprise one or more of elements such as a FPGA (field programmable gate array) or a microcontroller.

The video signals may then be provided to one or more of display systems 130a, 130b through, in this illustrated example, serial interface 640, 642.

Display systems 130a, 130b, in receiving the video signals present the received information on display screens 350.

In one aspect of the invention, the display technology utilized for display units 130a, 130b, may comprise one of an OLED (organic light emitting diode) display, a ferroelectric liquid crystal (FLC) display, liquid crystal display (LCD) or any equivalent display that may be mounted in the carrier lenses area.

In one aspect of the invention, display units 130a, 130b utilizing an OLED display technology may allow for the emission of light from each of the individual pixels of the display screen such that the image is formed by the individual pixels and an additional light source or filter is not necessary.

In another aspect of the invention, wherein an LCD using FLC technology may require an additional light source 660 and polarizer filter to properly view the displayed image.

That is, to illuminate an LCD display an external light source such as backlighting may be used, wherein the backlight may consist of an array of light emitting diodes (LEDs) positioned behind or along the LCD panel.

Driver circuit 610 provides the necessary control to provide optimal color reproduction for different modes of operation depending on whether the backlighting is provided by a white LED or Red/Green/Blue (RGB) LED. A white LED may be driven by a constant current source from the video driver circuit 600 using a pulse width modulated (PWM) signal, for example, to control output intensity. The PWM function can be an output of a microcontroller 630 in the driver circuit 610, for example. Backlight LEDs can be wired in series or parallel with series being the preferred method due to its simplified design and provides optimum current matching between LEDs.

Control signals to the display screen 350 may be provided by the illustrated one driver circuit. In space limited designs, the driver circuit could be mounted on the temples with an interface to each of the two displays similar to that discussed with regard to driver circuits 215a, 215b. The display system 130a, 130b may include circuitry to provide for integrated horizontal and vertical scanners to drive the pixel array The driver circuit may output a compatible video format for the type of display used such as RGB8-8-8 24 bit parallel or YCrCb4:2:2 16 bit parallel or 8 bit serial. Other formats could include but, not limited to, YCrCb4:4:4 24 bit parallel, YCrCb4:4:2 16 bit parallel, In one aspect of the invention, the video driver circuit 600 may receive the input video from a source such as HDMI, DP, RGB, composite or any acceptable video standard. The input video may be buffered to provide signal balancing and isolation.

An FPGA or similar device processes the input video into the appropriate, in this case, serialized video format to be applied to the display systems 130a, 130b. The FPGA may be programmed with a core providing a color space converter that converts three input color samples to three output color samples compatible with the display input format.

Video bridge 617 is used on the output to buffer and drive the two illustrated individual displays while maintaining signal integrity.

A micro controller 630 provides control of the displays and driver circuit via a serial protocol such as I²C or SPI, or similar protocol. Control features may include, but not limited to, video offset, cropping, scaling and LED control. The micro controller 630 may also provide control of the LED backlighting and timing 660.

Discrete signals and settings may be controlled individually by the micro-controller I/O ports or as a single unit. Analog inputs can be monitored through individual ports of the micro controller as well.

Figure 7:
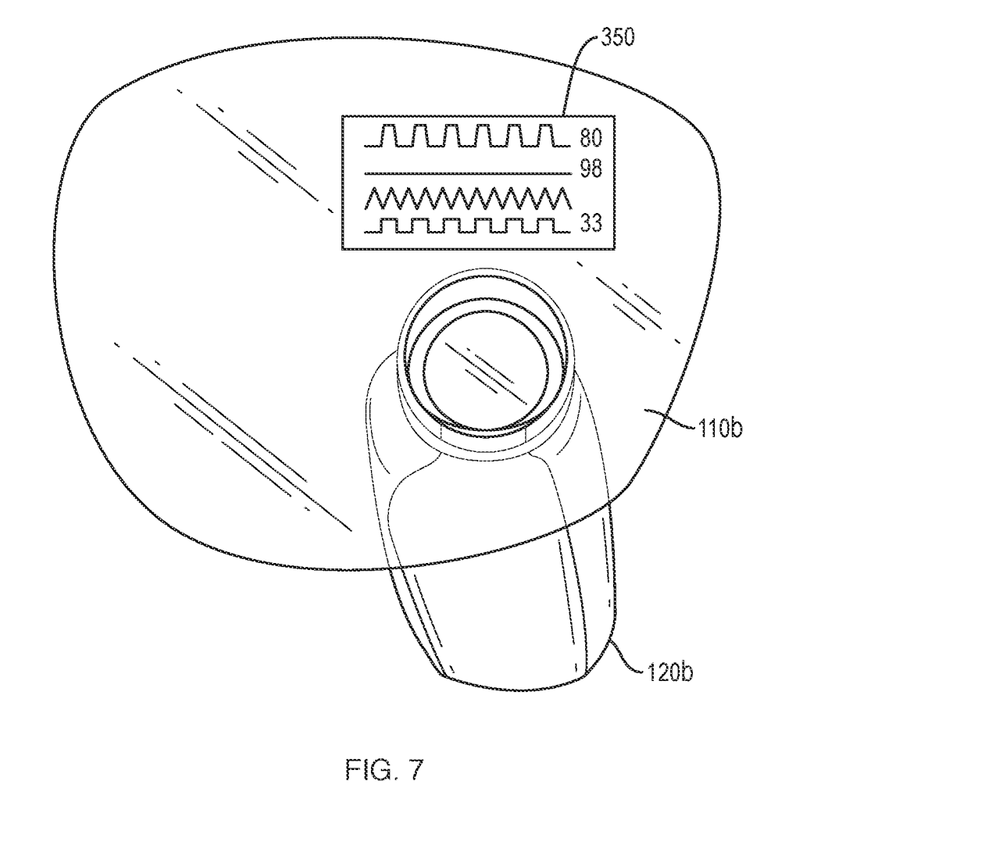
FIG. 7 illustrates an expanded view for an exemplary display configuration in accordance with the principles of the invention

FIG. 7 illustrates an example of information provided to a user through the display screen 350 of display unit 130b.

In this exemplary illustration, which represents the display system 130b incorporated through left lens carrier 110b, the view of display screen 350 is within the line-of-sight of the user, such that the user may view the provided information. For example, information such as heart rate, heart rate oscillations, respiration rate, respiration oscillation, blood pressure, etc., may be viewed by the user on display screen 350. The information provided on display screen 350 may be the same or similar to the information obtained from medical devices that would conventionally be displayed on large overhead monitors or individual equipments. In another aspect of the invention, the information provided on display screen 350 may comprise instructional information that the user may read while retaining substantial focus on a work area.

The through-the-lens display system disclosed, herein, provides an image that is properly presented onto the user's retina, to enable the user to obtain vital information that would normally require the user to redirect, and focus, their eyes toward an external monitor or another source to obtain the same information.

Figure 8:
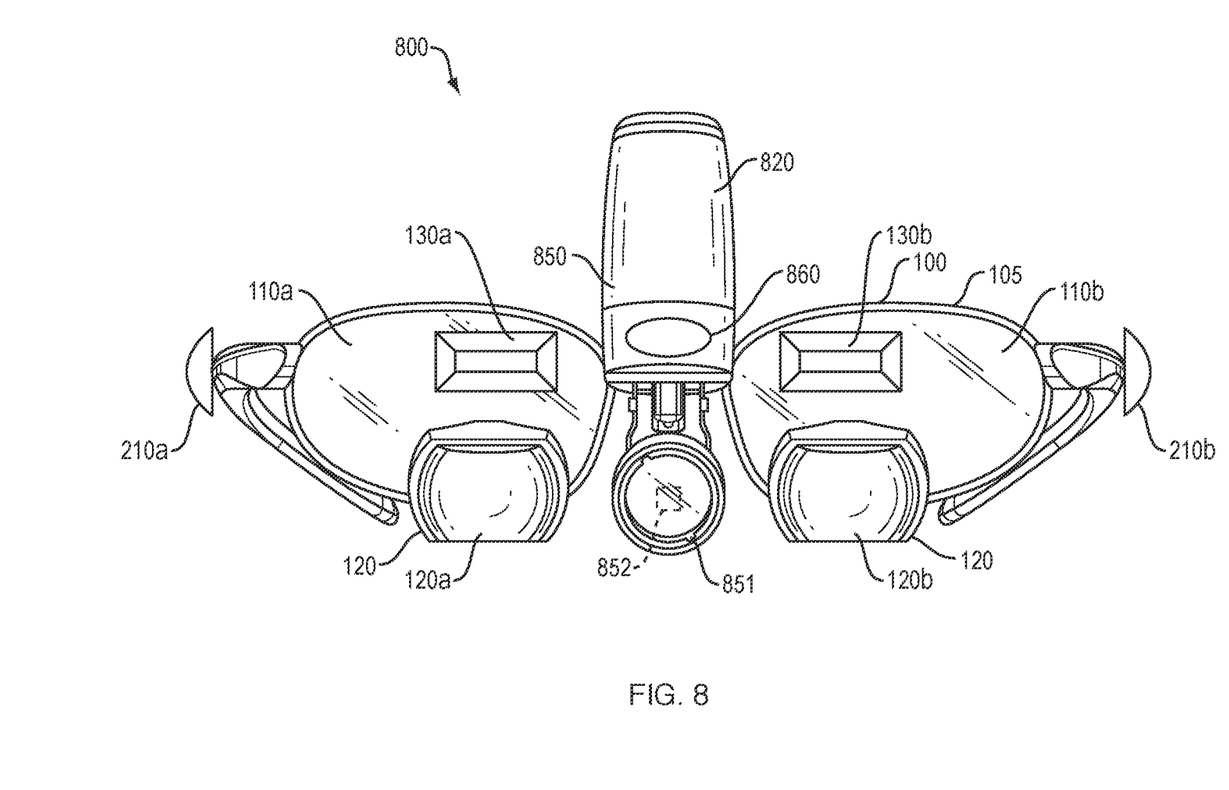
FIG. 8 illustrates a front view of a first implementation of the eyewear configuration shown in FIG. 1.

FIG. 8 illustrates a front view of an exemplary implementation of an eyewear incorporating a through-the-lens heads-up display in accordance with the principles of the invention In this illustrated embodiment, eyewear assembly 800 designed for the medical and/or dental industries. Eyewear assembly 800 comprises eyewear 100 comprising lens carrier 110 (of which left lens carrier 110a and right lens carrier 110b are shown). Left lens carrier 110a and right lens carrier 110b may be ordinary lenses (plano) or may be corrective (i.e. prescriptive) lenses. In addition, left lens carrier 100a and right lens carrier 110b may further be clear or tinted, wherein the tinting may be used to protect the eyes from stray light that may be damaging to the user.

Further illustrated are magnification devices 120a, 120b incorporated into left lens carrier 110a and right lens carrier 110b, respectively. Magnification devices 120a, 120b may include a filtering system that provides for the selective passage of light through magnification devices 120a, 120b.

Display system 130a, 130b are further illustrated and incorporated into lens carrier 110a, 110b, respectively. Display system 130a, 130b, as discussed, provide visual information to a practitioner that allows the practitioner to remain focused on, or retain their position with respect to, a work area. For example, information regarding status of a patient, that is presented on a monitor, to be presented by display system 130a, 130b need only require a shifting of the eyes to view the information. In a preferred embodiment, the display screens 350 associated with display systems 130a, 130b are positioned as a substantially same IPD as that of the magnification devices 120a, 120b and, thus, the eyes are not required to re-focus to obtain the displayed information.

Further illustrated are driver circuits 210a, 201b that provide video information to display system 110a, 110b, respectively. While driver circuits 210a, 210b are shown attached to the temples 115a, 115b, of eyewear 100, it would be understood that driver circuits 210a, 210b may be positioned remote from eyewear 100 and the video images may be provided to display system 130a, 130b through a wired connector or a wireless connection. For example, driver circuits 210a, 201b (or a single driver circuit), may be positioned remote from the eyewear 100 and may be in wireless communication (e.g., BLUETOOTH) with a receiver positioned near or within a corresponding one of the display system 130a, 130b, wherein the driver circuit signals may be transmitted to and received by display system 130a, 130b. In one aspect of the invention, display system 130a, 130b may include a wireless receiving system (not shown) that receives information transmitted by a wireless system (e.g., WI-FI, BLUETOOTH, or similar short range communication protocol). Electronic circuitry incorporated into display units 130a, 130b in receiving the transmitted signals converts the received signal into a format suitable for presentation on display screen 350. Alternatively, a wireless receiving system may be positioned on temples 115a, 115b to receive video signals that may be provided to display system 130a, 130b. In another aspect of the invention, separate receiving systems may be utilized, which after receiving transmitted information provide the transmitted information to display system 130a, 130b through a wired connection. In still another aspect of the invention, information may be provided to display systems 130a, 130b through a wired connection directly from a remotely located driver circuit.

In this exemplary embodiment, display units 130a, 130b are arranged within carrier lens 110a, 110b are at a position similar to that of magnification lens 120a, 120b such that the IPD between display screens 350 associated with display units 130a, 130b is essentially the same.

As the IPD of display screens 350 associated with display systems 130a, 130b is essentially the same as that of magnification devices 120a, 120b, the practitioner is able to view the displayed images without having to re-focus their eyes to a different point in space.

Further illustrated is headlight assembly 850, including housing 851, including at least one light source (e.g., non-lasing LED and/or diode laser) 852 contained therein. The housing 851 and the lighting source 852 are oriented at an angle (with respect to a horizontal light through eyewear assembly 800) similar to that of the angle of magnification devices 120a, 120b in order to direct light generated by the lighting source 852 to an area or point (310, FIG. 3) that is substantially convergent with a focal point of magnification devices 120a, 120b.

Further illustrated is pod 820. Pod 820 contains a power source (i.e., a battery) that is used to power the lighting source 852 and other electronic circuitry (not shown) that is used to control a voltage (or current) applied to the lighting source 852. The power source may, in addition, supply power to driver circuits 210a, 201b.

Further illustrated is a contact or contactless control means 860 for controlling the application of a voltage or current to light source 852.

For example, the control means 860 may be configured to allow for a capacitive touch of a metallic elements on pod 820 to apply or remove a voltage or current applied to the lighting source 852. In another aspect of the invention, control means 860 may be configured to allow for a non-contact control of the voltage (or current) applied to the lighting source 852.

Although the power source is shown attached to the eyewear, it would be recognized that the power source may be separated from the eyewear assembly 800 and those skilled in the art would have the knowledge to alter the configuration shown, herein, to provide, power remotely, to the lighting source 852 (driver circuits 210a, 210b) without undue experimentation. In addition, a separate power source (not shown) may be used to provide power to driver circuits 210a, 210b.

Figure 9:
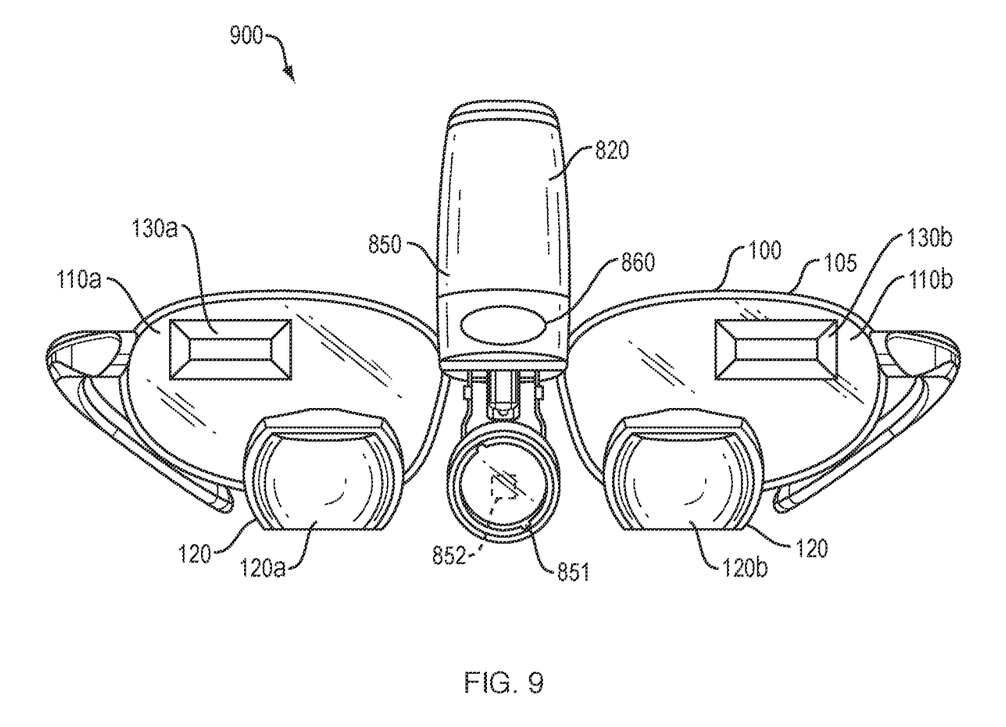
FIG. 9 illustrates a front view a second implementation of the eyewear configuration shown in FIG. 1.

FIG. 9 illustrates a front view of a second exemplary embodiment of an eyewear incorporating a heads-up display in accordance with the principles of the invention.

In this exemplary embodiment, which includes components similar to those described with regard to FIG. 8, display systems 130a, 130b are positioned within lens carriers 110a, 110b at an IPD different than that of the IPD of magnification devices 120a, 120b. In this case, viewing display screens 350 of display systems 130a, 130b requires the practitioner to orient their eyes to a focus on a far-field image.

The choice of providing a near-field view or a far-field view is one of preference by the practitioner and the selection of different near-field or far-field viewing and the required IPD value is based on individual user preferences and is considered within the scope of the invention claimed.

Figure 10:
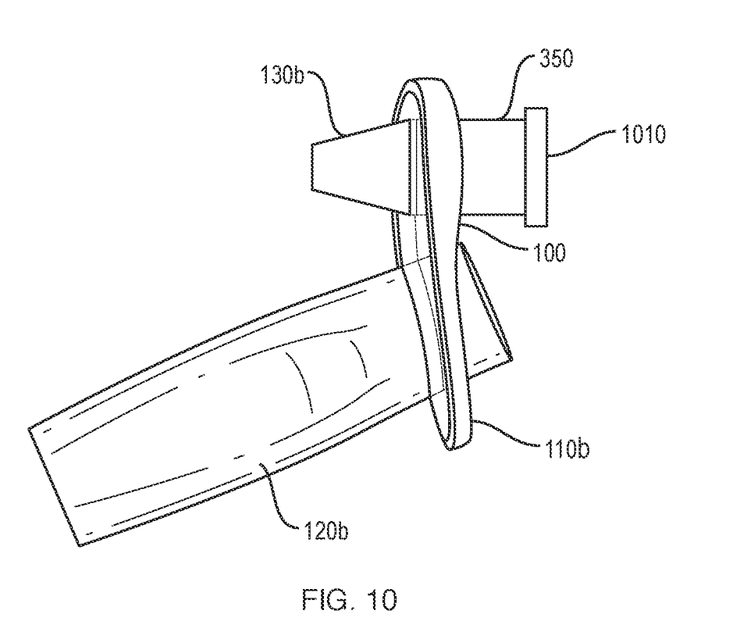
FIG. 10 illustrates a right-side view of a second aspect of the eyewear configuration shown in FIG. 1.

FIG. 10 illustrates a right-side view, similar to FIG. 4, showing a further aspect of the invention claimed.

In this exemplary aspect of the eyewear 100, spectacle correction lens 1010 is positioned on a proximal end of through-the-lens display 130b, wherein lens 1010 is positioned between display screen 350 and a user's eye (not shown). Spectacle correction lens 1010 may be one or both of spherical and cylindrical is shown As would be recognized by those skilled in the art, as the lens carrier 110 (and the display screen 350, which is positioned proximate to the user's eye) is positioned close to the eye(s) of the user, a spectacle correction lens 1010 may be included to enable the images presented on the display screen 350 to be focused onto the user's retina.

In one aspect of the invention, the spectral correction lens carrier may be the same or similar to a spectacle correction that may be incorporated into lenses 110a, 110b when the user requires such vision correction (i.e., prescriptive lens).

In a second aspect of the invention, lens 1010 may be required even when the practitioner does not require prescriptive lens as a distance between display screen 350 and the practitioner's eyes may be such that the displayed image is properly focused on the user's retina. In this case, lens 1010 may be a plano lens, if desired, and no corrective lens is required.

Figure 11:
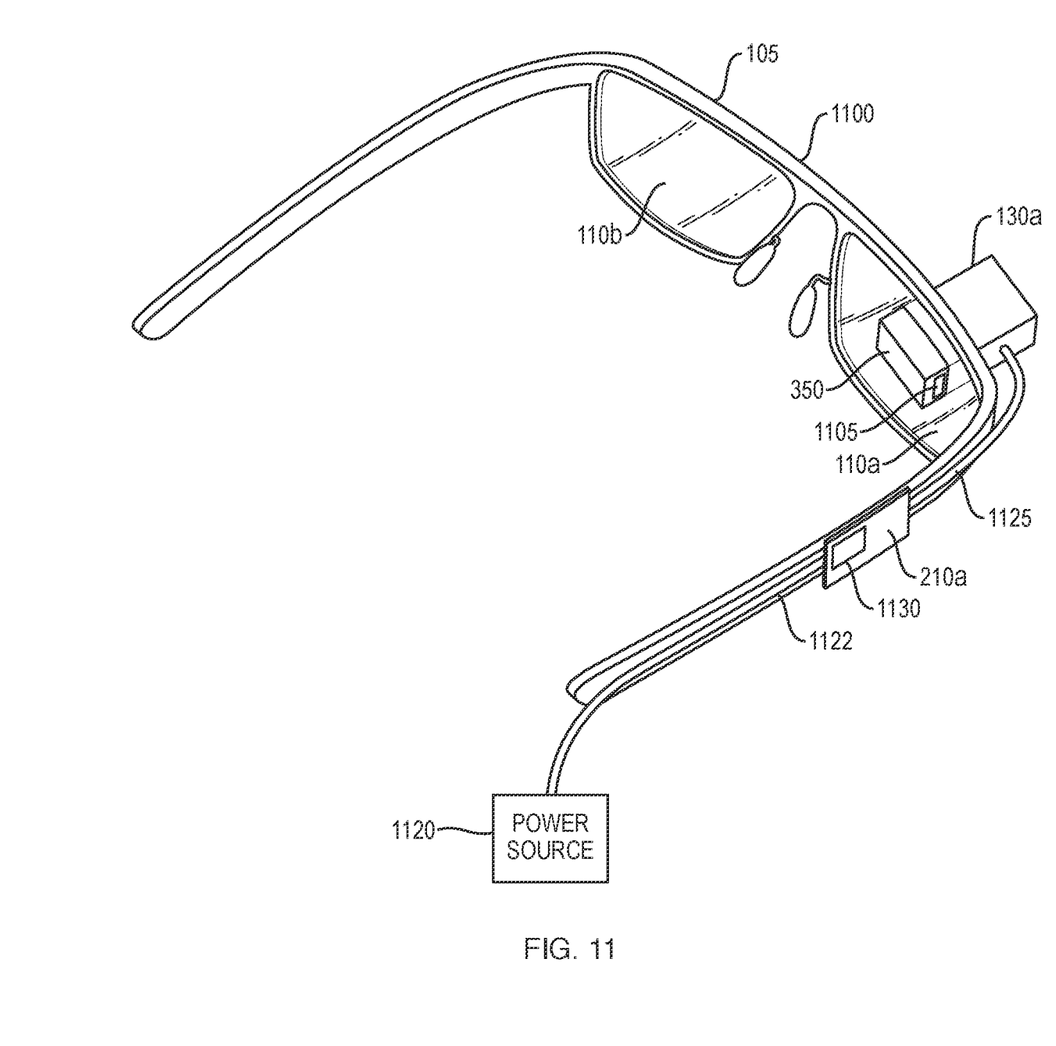
FIG. 11 illustrates a left-side view a second exemplary embodiment of a through-the-lens heads-up/eyewear configuration in accordance with the principles of the invention.

FIG. 11 illustrates a prospective view of another exemplary embodiment of a through-the-lens heads-up display system in accordance with the principles of the invention.

In this exemplary embodiment eyewear 1100 comprises frame 100 including lenses 110a, 110b as previously disclosed, wherein a single display system 130a is shown incorporated into lens 110a. Although a single display system 130a is shown it would be recognized that the principles of the invention shown with respect to display system 130a would be applicable to a second display system incorporated into lens 110b.

Further illustrated is driver circuit 210a electrically connected to display system 130a through a wired connection 1125. Driver circuit 210a is provided power through wires 1122 from power source 1120.

Incorporated within driver circuit 210a is wireless receiver 1130 that is configured to receive wireless signals associated information that may be provided to a practitioner on display screen 350. Wireless signals may be communicated to wireless receiver 1130 through one or more near field communication protocols (e.g., BLUETOOTH) or through a local area network (e.g., Wi-Fi). The received signal may then be processed in driver circuit 210a or in display system 130a for subsequent presentation on display screen 350.

Although wireless receiver 1130 is shown incorporated into driver circuit 210a, it would be understood, and referred to previously, that the wireless receiver 1130 may be incorporated into display system 130, which may receive video signals in a format suitable for presentation on display screen 350 or videos signals that may be converted by display system 130a to a format suitable for presentation on display screen 350.

Further illustrated is focus control 1105 that may be utilized to focus the image viewed on display screen 350. Focus control 1105 provides for a change of a position of a lens within display system 130a that enables the image viewed by the user to be rendered sharp. Focus control 1105 compensates for the closeness of display screen 350 to the user's eyes, in the case the user's eyes cannot focus to the small distance display screen 350 is from the user's eye.

Although not shown, it would be recognized that driver circuit 210a, 210b and display system 130a, 130b may include well-known electronic components, such as resistors, capacitors, diodes, transistor, application specific circuitries (ASICS), field programmable gate arrays (FPGA) or microprocessors, for receiving signals, translating signals to viewable information and displaying such information. A detailed discussion of such components is not believed necessary to those skilled in the art to practice the invention as disclosed, and claimed, herein.

In summary, a through-the-lens heads-up display incorporated into a binocular device is disclosed, wherein the heads-up display is incorporated into the lens carriers of an eyewear, for example, so as to allow a practitioner to view information that would typically be presented on an external display screen.

In addition, the eyewear may include magnification devices within the lens carriers that are oriented to focus onto a known area, wherein the heads-up display may be oriented such that the user need not lose focus of the area to view the provided information.

One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention. Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure. Furthermore, the values presented herein are merely to illustrate the concepts and are not to be considered as the only values that have been contemplated and considered.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. An eyewear comprising:
   a frame;
   a right lens,
   a left lens; and
   a display system positioned through at least one of said right lens and said left lens, wherein the display system comprises:
   a display screen positioned proximate to, and in line with, an eye of said user, wherein said display screen is closer to said eye than said at least one of said right lens and said left lens; and
   at least one of: a spectral correction lens associated with said display screen and a focus control associated with said display system, said focus control configured to:
   adjust an image displayed on said display screen to render said displayed image in focus to said eye of said user.

2. The eyewear of claim 1, comprising:
   a magnification device incorporated into each of said right lens and said lefts lens, wherein said magnification devices are arranged at angle to focus onto a near field area.

3. The eyewear of claim 2, wherein the magnification devices are spaced apart by an inter-pupil distance of said user.

4. The eyewear of claim 3, wherein the display system associated with each of said right lens and said left lens is spaced apart by said inter-pupil distance.

5. The eyewear of claim 1, wherein the display system associated with said right lens and said left lens is arranged at angle to focus onto a near field area.

6. The eyewear of claim 1, wherein the display system associated with said right lens and said left lens is arranged at an angle to focus onto a far field area.

7. An eyewear comprising:
   a first lens,
   a second lens;
   a magnification device incorporated into each of said first lens and said second lens; and
   a first display system incorporated through said first lens; and
   a second display system incorporated through said second lens, each of said first display system and said second display system comprising:
   a display screen proximate to an eye of user, wherein said display screen is closer to said eye of said user than said first lens and said second lens;
   a spectral correction lens positioned on a distal end of each of said first display system and said second display system, wherein a distance between said display screen of said first display system and said display screen of said second display system is substantially equal to a distance between said magnification device incorporated into said first lens and said magnification device incorporated into said second lens; and a focus control associated with each of said first display system and said second display system, said focus control configured to:
adjust an image displayed on a corresponding one of said display screen of said first display system and said display screen of said second display system to render said displayed image in focus with respect said eye of said user.

8. The eyewear of claim 7 comprising:
a first driver circuit configured to:
receive video signals;
convert said received video signals to a format suitable for presentation on at least one of said display screen of said first display system and said display screen of said second display system.

9. The eyewear of claim 7 comprising:
a second driver circuit configured to:
convert said received video signals to a format suitable for presentation on at least one of said display screen of said first display system and said display screen of said second display system.

10. The eyewear of claim 8, comprises:
a wireless receiver configured to receive said video signals through one of: a near field communication protocol and a local area network communication protocol.

11. The eyewear of claim 9, comprises:
a wireless receiver configured to receive said video signals through one of: a near field communication protocol and a local area network communication protocol.

\* \* \* \* \*